United States Patent [19]
Cotton

[11] 3,760,211
[45] Sept. 18, 1973

[54] WIRING CONNECTION TO A BRUSH ASSEMBLY IN A DYNAMO ELECTRIC MACHINE

[75] Inventor: Herbert John Thomas Cotton, Hollywood, England

[73] Assignee: Joseph Lucas (Industries) Limited, Birmingham, England

[22] Filed: Mar. 1, 1972

[21] Appl. No.: 230,623

[30] Foreign Application Priority Data
Mar. 2, 1971 Great Britain .................. 5,860/71

[52] U.S. Cl. ............................................ 310/242
[51] Int. Cl. .......................................... H02k 13/00
[58] Field of Search ............... 310/68, 68 D, 239, 310/242, 240, 241, 71, 91, 66

[56] References Cited
UNITED STATES PATENTS

| | | | |
|---|---|---|---|
| 3,422,339 | 1/1969 | Baker | 310/68 D |
| 3,602,793 | 8/1971 | Grozinger | 310/68 |
| 3,329,841 | 7/1967 | Binder | 310/68 |
| 3,361,915 | 1/1968 | Baker | 310/68 |
| 3,527,972 | 9/1970 | Franz | 310/68 D |

Primary Examiner—R. Skudy
Attorney—Holman & Stern

[57] ABSTRACT

A dynamo electric machine comprises a stator, a rotor, a pair of slip rings mounted on the shaft of the rotor, and a pair of brushes. The brushes are mounted in a housing which is bolted to a printed circuit board surrounding the rotor shaft by bolts passing through bosses in the housing. Torsion springs are mounted on the bosses and urge the brushes against the slip rings. The bolts are electrically connected to appropriate parts of the printed circuit board and leads extend from the brushes to the bolts so that the brushes are electrically connected to the printed circuit by way of the bolts.

3 Claims, 4 Drawing Figures

WIRING CONNECTION TO A BRUSH ASSEMBLY IN A DYNAMO ELECTRIC MACHINE

This invention relates to dynamo electric machines.

According to the invention a dynamo electric machine, having rotating contact elements and a wiring arrangement supported on an insulating base, to which wiring arrangement the several parts of the machine circuit are connected, includes a brush assembly comprising a housing, a plurality of brushes slidable in the housing a plurality of bosses provided on said housing, biassing means urging said brushes into engagement with said contact elements, and a fixing means extending between housing and said insulating base and through each to secure the boss housing to the base each said fixing means also providing an electrical connection between as associated brush and a part of said wiring arrangement.

A dynamo electric machine according to the invention will now be described by way of example and with reference to the accompanying drawings, in which.

Figure 1:
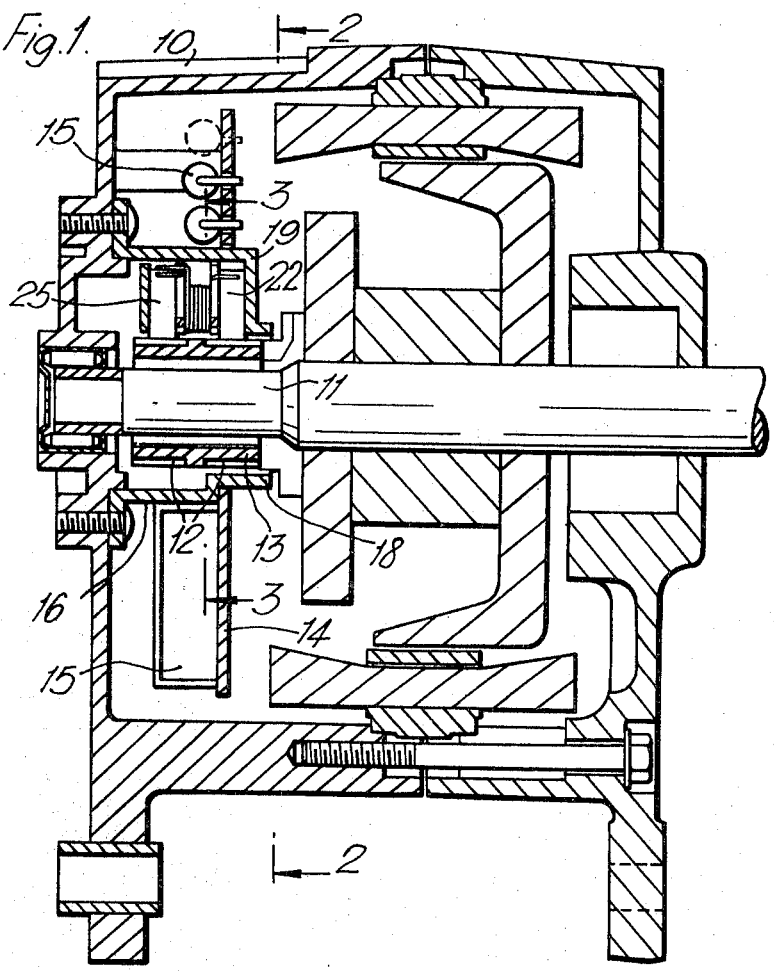
FIG. 1 is a longitudinal section through a machine.
Figure 4:
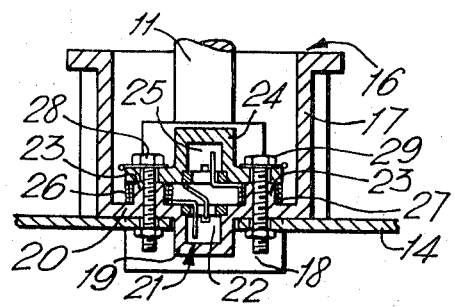
FIG. 4 is a scrap section line 4—4 in in FIG. 3.
Figure 2:
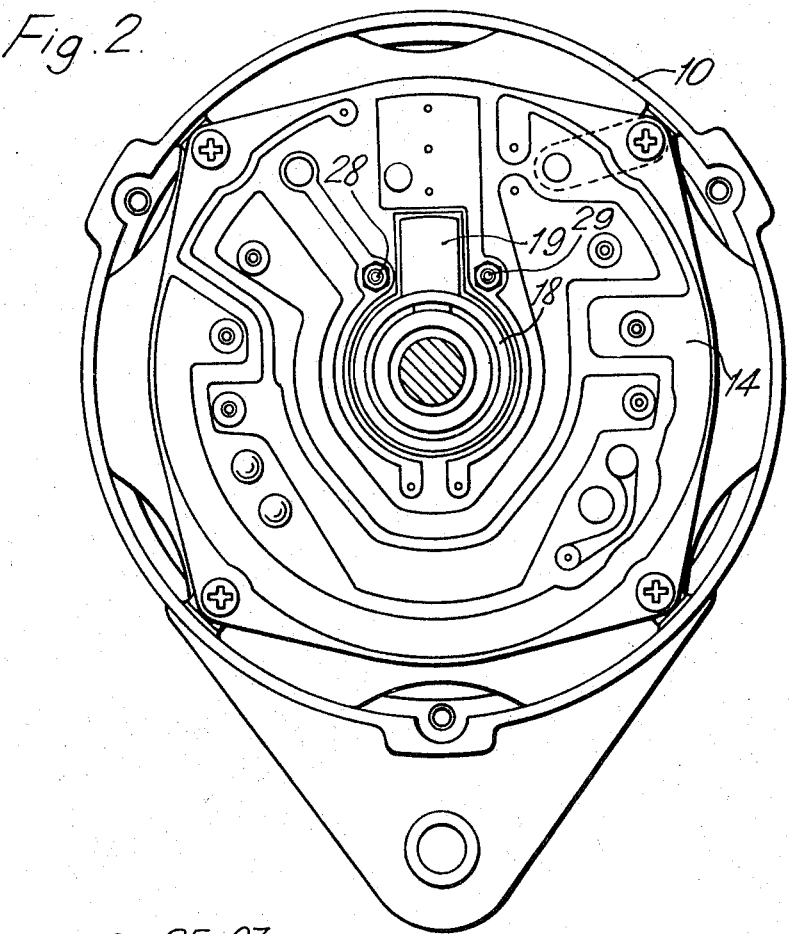
FIGS. 2 and 3 are sections on the corresponding lines in FIG. 1.

The machine has a frame 10 which forms part of the machine stator and a shaft 11 forming part of the machine rotor and journalled in frame 10. A pair of sliprings 12 are carried on an insulating sleeve 13 on shaft 11. Mounted within frame 10 is an insulating base in the form of an insulating board 14 upon which is a printed wiring conductor pattern, electrical components 15 being secured to the board 14 to contact selected conductors of the pattern.

Figure 3:
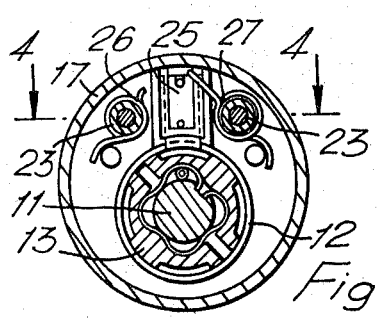

Also mounted within frame 10 is a housing 16 which is of insulating material and which has a cylindrical portion 17 which is eccentric with respect to shaft 11 (FIG. 3). Housing 16 also has a further cylindrical portion 18 concentric with shaft 11 and a rectangular portion 19 which extends from an end wall 20 of the portion 17. Rectangular portion 19 extends through a corresponding slot in board 14. Portion 19 defines a channel 21 within which a brush 22 is slidable. The housing 16 also includes a pair of integral bosses 23 which locate an insulating flanged channel 24 within which a further brush 25 is slidable. Torsion springs 26, 27 are located on bosses 23 and respectively bias brushes 22, 25 towards slip rings 12.

Channel 24 is secured to bosses 23 by screws 28, 29. Leads from brushes 22, 25 are attached to terminals secured under the heads of metal screws 28, 29 respectively. Screws 28, 29 pass through the board 14 and secure the board 14 to the end wall 20 of housing 16. Screws 28, 29 make contact, via their associated nuts, with appropriate parts of the conductor pattern on board 14, and thereby complete electrical connections to the brushes 22, 25.

I claim:

1. A dynamo electric machine having rotary contact elements and a wiring arrangement supported on an insulating base, to which wiring arrangement a plurality of parts of the machine circuit are connected, includes a brush assembly comprising a housing, a plurality of bosses provided on said housing, a plurality of brushes slidable in the housing, a spring mounted on each boss, said springs urging said brushes into engagement with said contact elements, and a fixing means extending between said housing and said insulating base and through each boss to secure the housing to the base, each said fixing means also providing an electrical connection between an associated brush and a part of said wiring arrangement.

2. A dynamo electric machine as claimed in claim 1, wherein the housing includes a cylindrical portion mounted eccentrically with respect to a rotor shaft of the machine and a rectangular portion extending from an end wall of the cylindrical portion, said rectangular portion slidably receiving on e of the brushes and passing through an aperture in the insulating base.

3. A dynamo electric machine as claimed in claim 1, wherein a flanged channel member forming part of the housing slidably receives on of the brushes and is secured relative to the insulating base and the remainder of the housing by the fixing means.

* * * * *